United States Patent Office 3,389,175
Patented June 18, 1968

3,389,175
STABLE TETRACYCLINE SOLUTIONS
Robert Arnold Nash, Spring Valley, and Bruce Edwin Haeger, Pomona, N.Y., assignors to American Cyanamid Company, Stamford, Conn., a corporation of Maine
No Drawing. Original application Oct. 4, 1962, Ser. No. 228,261, now Patent No. 3,219,529, dated Nov. 23, 1965. Divided and this application May 10, 1965, Ser. No. 454,671
8 Claims. (Cl. 260—559)

ABSTRACT OF THE DISCLOSURE

Stable solutions of neutral tetracycline antibiotics in amides of higher molecular weight aliphatic fatty acids disubstituted by lower alkyl groups, the fatty acids having from 8 to 14 carbon atoms. Ordinary substituted commercial lauramides such as dimethyl lauramide give good results in making stable solutions useful for topical or other therapeutic uses.

---

This application is a division of our copending application Ser. No. 228,261, filed Oct. 4, 1962, now U.S. Patent No. 3,219,529.

This invention relates to stable antibiotic solutions of the tetracycline group. As used in the specification and claims the term "antibiotic solution" means a solution containing substantial amounts of antibiotic. Compositions containing small traces of antibiotic are not included.

In the past there has been a demand for solutions of tetracycline antibiotics which would be stable and which could be used for topical or other therapeutic uses. For the most part the solutions have been prepared by forming metal complexes with the tetracyclines. Stability has been achieved but in a number of cases the presence of metal ion complexes are not always desirable, and while they have been practically useful, there is still a need for stable, relatively non-toxic solutions of neutral tetracycline antibiotics. It is with the solution of this problem and with stable solutions that the present invention deals. It should be understood that in the present invention we are concerned with so called neutral tetracyclines, that is to say the amphoteric tetracyclines themselves, and not their salts with various acids or bases.

The requirements for satisfactory tetracycline antibiotic solutions require stability on storage at room temperatures, lack of toxicity and retention of the antibiotic activity. Reasonable compatibility with water is also a desirable characteristic as sometimes the solutions are utilized in aqueous media.

Basically, the present invention is concerned with stable solutions of neutral tetracyclines in amides of higher molecular weight aliphatic fatty acids disubstituted by lower alkyl groups. In general, the fatty acids from 8 to 14 carbon atoms give the best results. These are often mixtures and it does not appear to be of any particular significance whether the aliphatic fatty acid portion of the molecule is a pure radical. For example, ordinary substituted commercial lauramides give good results.

The invention will be described in greater detail in conjunction with the following specific examples. In each case the solution is prepared with thorough stirring. It should be noted that the tetracycline antibiotic weights are in the neutral form, rather than the customary basis as the hydrochlorides. The pH values in the samples were measured potentiometrically using glass and saturated calomel electrodes.

EXAMPLE 1

2.5 grams of tetracycline are dissolved in 50 ml. of dimethyl lauramide. A stable solution results.

EXAMPLE 2

The stability of the solutions of the present invention were tested against other typical organic solvents in two ways. First, by an accelerated test, autoclaving at 121° C., and secondly, at a lower temperature for a longer period of storage. In every case the antibiotic was tetracycline and the concentration 50 mg./ml. Table 1 shows the stability after autoclaving.

TABLE 1.—AUTOCLAVE STABILITY OF NEUTRAL TETRACYCLINE (50 MG./Ml. AS TC·HCl) IN VARIOUS SOLVENTS AT 121° C.

| Solvent | Microbiological Activity (Percent of Theory) | | |
|---|---|---|---|
|  | 30 min. | 60 min. | 120 min. |
| Diethyl Nicotinamide | 66 | 51 | 27 |
| Dimethyl Acetamide | 43 | 28 | 20 |
| Dimethyl Lactamide | 16 | 17 | 17 |
| Dimethyl Lauramide | 82 | 81 | 70 |
| 1,3-dioxolane | 46 | 39 | 32 |
| Ethanol (abs.) | 36 | 12 | 2 |
| Isopropylidene Glycol | 67 | 58 | 42 |
| Polyethylene Glycol 400 | 58 | 37 | <5 |
| Propylene Glycol | <5 | <5 | <5 |

It will be noted that even at two hours autoclaving the solution of dimethyl lauramide retained at least two-thirds of its antibiotic activity, whereas the best that any other solvent did, isopropylidene glycol was less than half.

EXAMPLE 3

Tests were made at room temperature and 42° C. for extended periods of time. The results of these tests are shown in Table 2. As in the case of the preceding tests, the solution was of tetracycline in a concentration of 50 mg./ml.

TABLE 2.—STABILITY OF NEUTRAL TETRACYCLINE (50 MG./ML. AS TC·HCl) IN VARIOUS SOLVENTS AT LOW TEMPERATURES

| Solvent | Initial | 42° C., 2 mon. | Microbiological Activity (Percent of Theory) at Room Temperature | | | |
|---|---|---|---|---|---|---|
|  |  |  | 2 mon. | 4 mon. | 6 mon. | 1 year |
| Diethyl Nicotinamide | 82 | 26 | 74 | <16 |  |  |
| Dimethyl Lauramide | 94 | 84 | 92 | 86 | 88 | 85 |
| Isopropylidene Glycol | 71 | 32 | 66 |  |  | 46 |

It will be noted that even at a shorter total length of time diethyl nicotinamide and isopropylidene glycol showed marked losses of activity as compared to the solution of dimethyl lauramide.

EXAMPLE 4

Tests were also made using other neutral tetracycline antibiotics in the solvent of the present invention. The results of this stability at room temperature for extended periods of storage are shown in Table 3.

TABLE 3.—STABLE SOLUTIONS OF OTHER NEUTRAL TETRACYCLINE ANTIBIOTICS AT THERAPEUTIC LEVELS

| System | Conven., mg./ml. | Microbiological Activity (percent of Theory) at Room Temperature | |
| --- | --- | --- | --- |
| | | 2 mon. | 1 year |
| CTC/Dimethyl Lauramide | 50 | 88 | |
| OTC/Dimethyl Lauramide | 50 | 106 | 89 |
| DMCTC/Dimethyl Lauramide | 50 | 98 | |
| DMTC/Dimethyl Lauramide | 50 | 101 | 92 |

CTC=Chlortetracycline; OTC=Oxytetracycline; DMCTC=Demethylchlortetracycline; DMTC=Demethyltetracycline.

Table 3 shows that many other neutral tetracycline antibiotics also retain their potency and physical stability in demethyl lauramide.

The stability of the compositions of the present invention is markedly decreased by the presence of such materials as water, bases, for example, triethanolamine, acids such as ascorbic acid, lactic acid, acetic acid, sulfuric acid, etc. Also certain solid adjuvants such as nicotinamide, isosorbide itself, caprolactam, should not be present. It should be noted that while the presence of water decreases the stability on long standing this does not mean that the products of the present invention may not be used when diluted with water. In fact this is often done but once diluted they will not retain their long-term stability. Dimethyl lauramide produces quite stable solutions, as is shown in the preceding tables, but it has rather poor water solubility and so is less desirable where dilution with water is necessary for administration.

We claim:
1. Stable solutions of neutral tetracycline antibiotics in lower dialkyl substituted amides of fatty acids of 8 to 14 carbon atoms.
2. Solutions according to claim 1 in which the amide is dimethyl lauramide.
3. Solutions according to claim 2 in which the antibiotic is tetracycline.
4. Solutions according to claim 1 in which the antibiotic is tetracycline.
5. Solutions according to claim 1 in which the antibiotic is chlortetracycline.
6. Solutions according to claim 1 in which the antibiotic is oxytetracycline.
7. Solutions according to claim 1 in which the antibiotic is demethyltetracycline.
8. Solutions according to claim 1 in which the antibiotic is demethylchlortetracycline.

No references cited.

NICHOLAS S. RIZZO, *Examiner*.